United States Patent [19]

Schulle et al.

[11] Patent Number: 5,351,424
[45] Date of Patent: Oct. 4, 1994

[54] MAGNIFIER WITH LIGHT THERETHROUGH FOR NEEDLEWORK FRAME

[76] Inventors: Gaylon E. Schulle; Kay C. Schulle, both of P.O. Box 161446, Austin, Tex. 78746

[21] Appl. No.: 79,010

[22] Filed: Jun. 18, 1993

[51] Int. Cl.⁵ .................... D05C 1/02; G02B 27/02; F21V 21/00
[52] U.S. Cl. ................... 38/102.1; 359/800; 359/802; 362/253
[58] Field of Search ............ 38/102, 102.1, 102.8; 362/120, 157, 253, 190, 191, 418, 208, 99; 359/811, 812, 818, 809, 800, 802, 798, 799, 803, 804

[56] References Cited

U.S. PATENT DOCUMENTS

| | | | |
|---|---|---|---|
| D. 318,756 | 8/1991 | Schulle | D3/26 |
| 2,104,198 | 1/1938 | Jones | 359/811 X |
| 2,316,301 | 4/1943 | Ullman | 359/800 |
| 4,190,322 | 2/1990 | Wortley | 359/811 X |
| 4,229,890 | 10/1980 | Dropinski | 38/102.1 |
| 4,545,479 | 10/1985 | Figari | 362/253 X |
| 4,944,105 | 7/1990 | Schulle | 38/102 |
| 4,984,378 | 1/1991 | Colman | 38/102 X |
| 5,021,933 | 6/1991 | Cordes | 362/253 X |
| 5,027,989 | 7/1991 | Nevius | 38/102.1 X |
| 5,103,384 | 4/1992 | Drohan | 362/190 X |

FOREIGN PATENT DOCUMENTS 3034157  4/1982  Fed. Rep. of Germany ...... 359/818

Primary Examiner—Clifford D. Crowder
Assistant Examiner—Ismael Izaguirre
Attorney, Agent, or Firm—Walter C. Farley

[57] ABSTRACT

A needlework support apparatus has a needlework fabric frame held above a base by side arms. A magnifying lens is held above the fabric by a length of flexible tubing, one end of which is attached to the lens and the other end of which is attached to arms connected to a side arm. A flashlight is mounted in a hole through the lens and held in place by O-rings. The lens and light are adjustable to magnify and illuminate a selected portion of the needlework fabric.

7 Claims, 2 Drawing Sheets

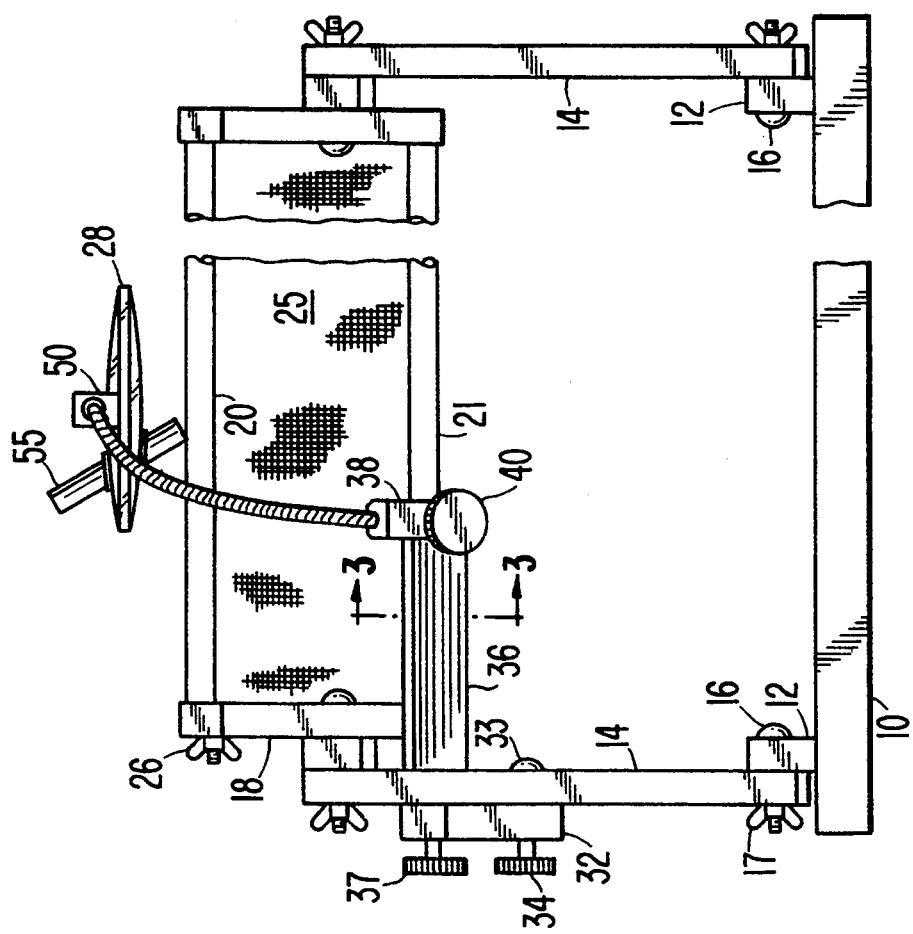
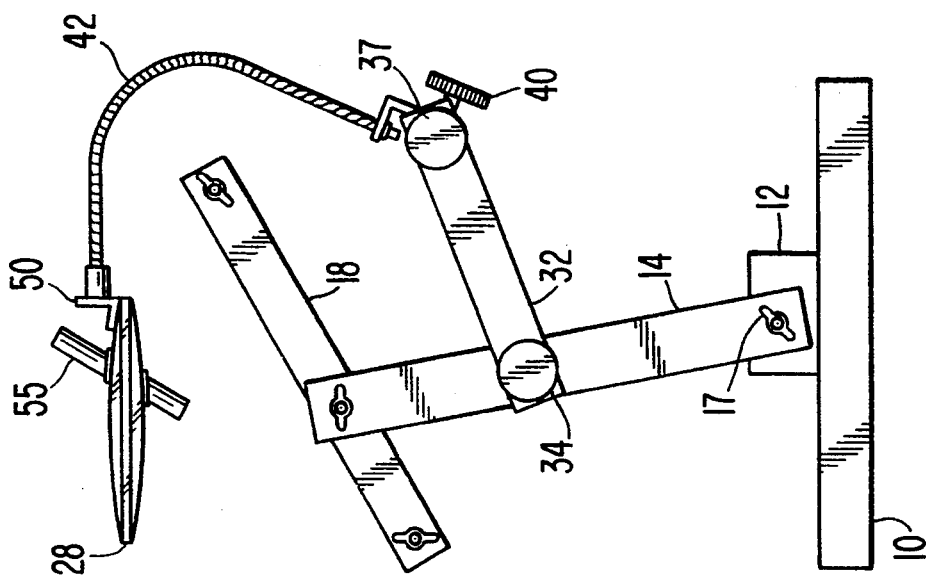

[5,351,424]

MAGNIFIER WITH LIGHT THERETHROUGH FOR NEEDLEWORK FRAME

FIELD OF THE INVENTION

This invention relates to an attachment for a needlework frame to provide magnification and light while retaining portability of the combination.

BACKGROUND OF THE INVENTION

In U.S Des. Pat. No. 318,756 and U.S Pat. No. 4,944,105 are disclosed needlework frames having a base, upwardly extending support arms and a frame attached to the support arms for holding needlework fabric. In each case, the frame includes upper and lower rods which have strips of canvas or similar fabric permanently attached to them. The fabric which is to become the needlework base is basted onto the canvas strips. The distance between the upper and lower rods is less than the top-to-bottom dimension of the needlework fabric, so the extra fabric is wound onto the rods. It can then be reeled from one rod to the other to expose any portion of interest in the space between the rods to allow the user to work on any selected part. In U.S. Pat. No. 4,944,105, the length of the base is adjustable to accommodate frames of different lengths.

One of the important advantages of the structure disclosed in those patents is portability and light weight. The frames are simple in their structure and yet sturdy and light so that a person can take the frame along when traveling or visiting to be able to work on the needlework when the opportunity presents itself.

There are, however, some individuals who find it difficult to work on some fabrics because of failing or weak eyesight, particularly when the fabric is one of the finer weaves which are sometimes used in cross-stitch and the like. There are also circumstances in which one wishes to work in places where the light is not as bright as needed.

SUMMARY OF THE INVENTION

An object of the present invention is to provide a magnifier attachment for a needlework frame which can also support a additional illumination and which maintains the light weight and portable characteristics of the previously developed frames.

Briefly described, the invention comprises a needlework support apparatus including a frame for holding needlework fabric, a base and side arms extending between the base and frame for supporting the frame above the base. A magnifying lens is connected to one end of a length of flexible tubing, the other end of the tubing being connected to a support structure attached to one of the side arms. A battery operated light source has a housing extending through an opening through the lens and is adjustably held in place in the lens, the tubing being bendable to position the lens and the light source so that a selected portion of the needlework fabric is magnified and illuminated.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this disclosure, and wherein:

FIG. 1 is a side elevation of a needlework frame fitted with an apparatus in accordance with the invention;

FIG. 2 is a foreshortened rear elevation of the apparatus of FIG. 1;

DESCRIPTION OF THE PREFERRED EMBODIMENT

Figure 5:
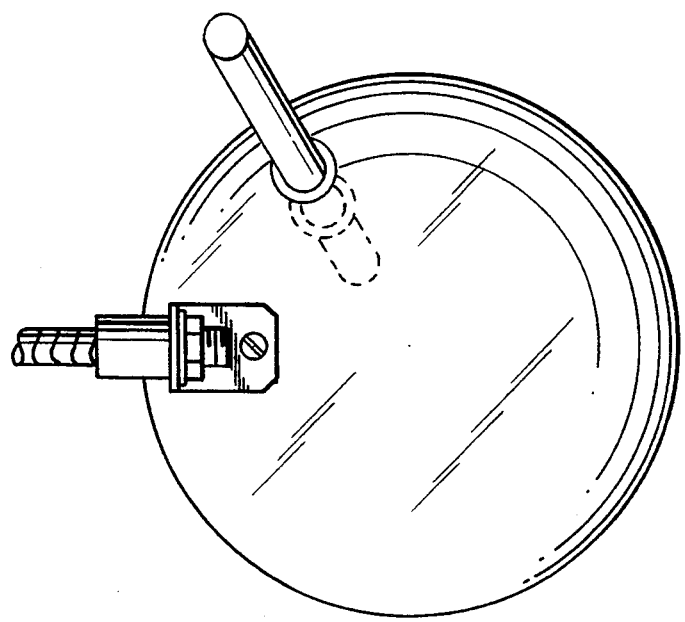
FIG. 5 is an enlarged top plan view of the magnifier and light of FIGS. 1 and 2.

A needlework frame of a type with which the apparatus of the invention is particularly useful is shown in FIGS. 1 and 2 in which the frame includes a flat, generally rectangular base 10 to the upper surface of which mounting blocks 12 are attached. The base and blocks are preferably made of a light-weight wood and can be fastened together using glue, screws or both. Upwardly extending side support arms 14 are attached to blocks 12 using bolts 16, washers and butterfly nuts 17 or the like so that the angle of arms 14 is adjustable relative to the base by loosening the nuts, positioning the arms and re-tightening the nuts.

At the upper ends of arms 14 is a rectangular frame having side arms 18 and upper and lower rods 20 and 21. Side arms 18 are attached to the upper ends of arms 14 also using bolts 23, washers and butterfly nuts 24 to allow re-positioning of the angle of the frame to the most convenient angle for work and also to permit flattening the entire frame for portability and storage.

As described above, and as described in more detail in U.S. Pat. No. 4,944,105, needlework fabric 25 is attached to canvas strips on rods 20 and 21 in such a way that it can be held rather tight between the rods to be worked on. The rods have threaded studs extending from their ends which pass through arms 18 and are attached with butterfly nuts 26 so that they can be loosened, rotated and re-tightened to adjust and select the part of the fabric which is exposed.

In accordance with the present invention, a magnifying lens 28 and light source 30 are provided so that fabric 25 and the threads be worked into that fabric can be more clearly seen. A support arrangement for the magnifier and light includes a pivotable arm 32 which is attached to one arm 14 using a bolt 33 which passes through holes in arms 14 and 32. A knob 34 having an internally threaded hole is threaded onto the threaded end of bolt 33 and can be loosened and tightened to adjust the angular position of arm 32 relative to arm 14. The periphery of knob 34 is preferably serrated so that the knob can be grasped easily. The opening through arm 14 for bolt 33 is preferably located about ⅔ of the length of the arm from bolt 16 although that spacing can be varied depending upon the sizes of the base and frame.

Figure 3:
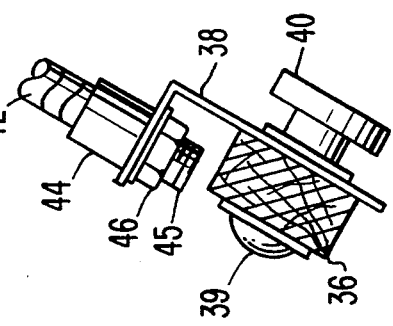
FIG. 3 is a transverse sectional view of a portion of one end of a magnifier and light mounting arrangement along line 3—3 of FIG. 2.
Figure 4:
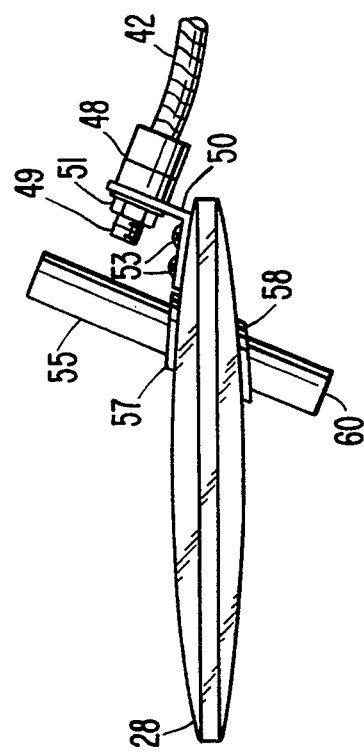
FIG. 4 is an enlarged side elevation of the other end of the magnifier and light mounting arrangement.

A transverse arm 36 is provided with a threaded stud protruding from one end thereof which passes through a hole near the distal end of arm 32. An internally threaded knob 37 is threaded onto the bolt to hold arm 36 at substantially a right angle relative to arm 32. The length of arm 36 is typically about 5–6 inches (125 to 150 mm) so that the distal end of arm 36 lies behind fabric 25 from the point of view of the user. One leg of an L-shaped bracket 38 is held on the distal end of arm 36 by a bolt 39 and a knob 40. The details of the bracket can be more clearly seen in FIG. 3. The other end of bracket 38 is directed toward fabric 25 and supports one end of a flexible metal tube 42. Tube 42 is made of a helically wound metal strip and is the type of tubing commonly used in lamps and referred to as flex tubing or gooseneck. As seen in FIG. 3, a conical ferrule 44 is attached to the end of the spiral tube and holds an externally threaded nipple 45. Nipple 45 passes through a hole in bracket 38 and ferrule 44 abuts the surface of the bracket. Nipple 45 is threaded into a nut 46 with a lock washer therebetween, securely mounting that end of the gooseneck onto arm 36.

The other end of gooseneck 42 similarly terminates in a ferrule 48 and nipple 49 which are attached to one leg of a second L-shaped bracket 50 by a nut 51 and lock washer. The other leg of bracket 50 is attached to magnifying lens 28 by machine screws 53 which are threaded directly into the lens.

In the present embodiment, lens 28 is a double convex lens made of plastic to minimize its weight and is about 4.75 inches (120 mm) in diameter and about ⅝ inch (15.9 mm) thick at the center.

A hole is formed through lens 28 about ½ inch (12.7 mm) from one edge to receive a small, battery-operated flashlight 55 which is about ½ inch (12.7 mm) in diameter and about 3 inches (76 mm) long. The hole through the lens for flashlight 55 is large enough to permit easy insertion of the flashlight which is held in place by rubber O-rings 57 and 58, one above and the other below the lens. The bulb in the flashlight is at the lower end 60 of the housing to illuminate an area of the fabric being worked on. O-rings 57 and 58 can be positioned at any location along the flashlight. This allows the flashlight to be adjusted axially so that more or less of the flashlight housing protrudes below the lens, permitting the beam of light produced by the bulb to be adjusted for best illumination, depending on the needs of the user and the portion of the needlework fabric which is being magnified. A suitable flashlight for this purpose is the SOLITAIRE ® single-cell flashlight marketed by Mag Instrument Inc., Ontario, Calif., but other flashlights of a similar nature can be used.

The angle of the hole for receiving the flashlight relative to a central axis of the lens is about 15°. This angle has been determined to provide good flexibility in the adjustment of the light source for good illumination under varying circumstances.

In use, arms 32 and 36 are attached to a needlework frame as described above and bracket 38 is attached to arm 36 with a bolt and knob 40. The arms and gooseneck 42 are then adjusted so that the needlework is in a convenient orientation and so that lens 28 is between the user and the needlework in a location to magnify the portion which is to be worked on. The flashlight can then be mounted in the lens, if it is not already so mounted, turned on and adjusted for optimum illumination. The lens and light are simple to install and to adjust during work on the needlework fabric without the need for tools or any special mechanical expertise and greatly increase the ease and pleasure of doing needlework.

While one advantageous embodiment has been chosen to illustrate the invention, it will be understood by those skilled in the art that various changes and modifications can be made therein without departing from the scope of the invention as defined in the appended claims.

What is claimed is:

1. A needlework support apparatus comprising the combination of means for holding needlework fabric;

a magnifying lens;

a length of flexible tubing connected at one end to said lens and at the other end to said means for holding;

a battery operated light source having a housing extending through an opening through said lens; and means for holding said light source in said lens, said tubing being bendable to position said lens and said light source at a position in which a selected portion of said needlework fabric is magnified and illuminated.

2. A needlework support apparatus comprising the combination of a frame for holding needlework fabric;

a base;

a plurality of side arms extending between said base and frame for supporting said frame above said base;

support means connected to one of said side arms;

magnifying lens;

a length of flexible tubing connected at one end to said lens and at the other end to said support means;

a battery operated light source having a housing extending through an opening through said lens; and means for holding said light source in said lens, said tubing being bendable to position said lens and said light source at a position in which a selected portion of said needlework fabric is magnified and illuminated.

3. An apparatus according to claim 2 wherein said support means includes a first arm attached at one end to said one of said side arms, a second arm attached to the other end of said first arm and extending substantially parallel with said base, and means for attachment of said second arm to said other end of said support means.

4. An apparatus according to claim 3 wherein said light source housing comprises an elongated cylinder and said means for holding said light source includes first and second O-rings dimensioned to frictionally engage said cylinder on opposite sides of said lens.

5. An apparatus according to claim 4 wherein said lens and said housing each have a central axis and said opening through said lens is formed so that said central axes are separated by an angle of about 15°.

6. An apparatus according to claim 2 wherein said light source housing comprises an elongated cylinder and said means for holding said light source includes first and second O-rings dimensioned to frictionally engage said cylinder on opposite sides of said lens.

7. An apparatus according to claim 2 wherein said lens and said housing each have a central axis and said opening through said lens is formed so that said central axes are separated by an angle of about 15°.

* * * * *